United States Patent [19]

Frantzerb, Sr.

[11] 4,122,238
[45] Oct. 24, 1978

[54] WELDING FLUX FORMULATION AND PROCESS FOR FUME REDUCTION

[75] Inventor: John G. Frantzerb, Sr., Peoria, Ill.

[73] Assignee: Caterpillar Tractor Co., Peoria, Ill.

[21] Appl. No.: 687,727

[22] Filed: May 19, 1976

[51] Int. Cl.² ...................... B32B 15/16; B23K 35/22
[52] U.S. Cl. ..................................... 428/558; 148/24; 219/137 R; 219/146.1; 428/564
[58] Field of Search ............ 219/146, 137 R; 148/24, 148/26; 428/558, 564

[56] References Cited

U.S. PATENT DOCUMENTS

| | | | |
|---|---|---|---|
| 3,177,340 | 4/1965 | Danhier | 219/146 |
| 3,405,250 | 10/1968 | Lee | 219/146 |
| 3,420,980 | 1/1969 | Annunziata | 219/146 |
| 3,461,270 | 8/1969 | Patton | 148/24 X |
| 3,513,289 | 5/1970 | Blake et al. | 219/146 |
| 3,539,765 | 11/1970 | Duttera et al. | 219/146 |
| 3,558,851 | 1/1971 | Oku | 219/146 |
| 3,560,702 | 2/1971 | Arikawa et al. | 219/146 |
| 3,603,763 | 9/1971 | Juzuenko | 219/146 |
| 3,702,390 | 11/1972 | Blake et al. | 219/146 |
| 3,745,294 | 7/1973 | Arikava et al. | 148/24 X |
| 3,796,609 | 3/1974 | Young et al. | 148/24 |
| 3,805,016 | 4/1974 | Soejimu et al. | 219/146 |
| 3,866,015 | 2/1975 | Matjumoto et al. | 219/146 |
| 3,868,491 | 2/1975 | Ito et al. | 219/146 |
| 3,875,363 | 4/1975 | Arikawa | 219/146 X |
| 3,911,244 | 10/1975 | Nakamura et al. | 219/146 |
| 3,924,091 | 12/1975 | Suzuki et al. | 219/146 X |

*Primary Examiner*—Richard E. Schafer
*Attorney, Agent, or Firm*—Phillips, Moore, Weissenberger, Lempio & Majestic

[57] ABSTRACT

The invention is concerned with a welding flux composition comprising a first alloy including iron, at least two metals reactive with oxygen under welding conditions and selected from the group consisting of aluminum, titanium, zirconium and boron and a weld improving metal selected from the group consisting of magnesium and manganese, said first alloy comprising from about 1 percent to about 4.5 percent by weight of the flux composition. The invention is also concerned with a weld forming composition comprising a metal tube having therewithin a welding flux as set out above. The invention is further concerned with a process for reducing particulate matter produced during the welding operation, comprising a welding flux used in said operation including from about 1 percent to about 4.5 percent by weight of the above first alloy.

15 Claims, 3 Drawing Figures

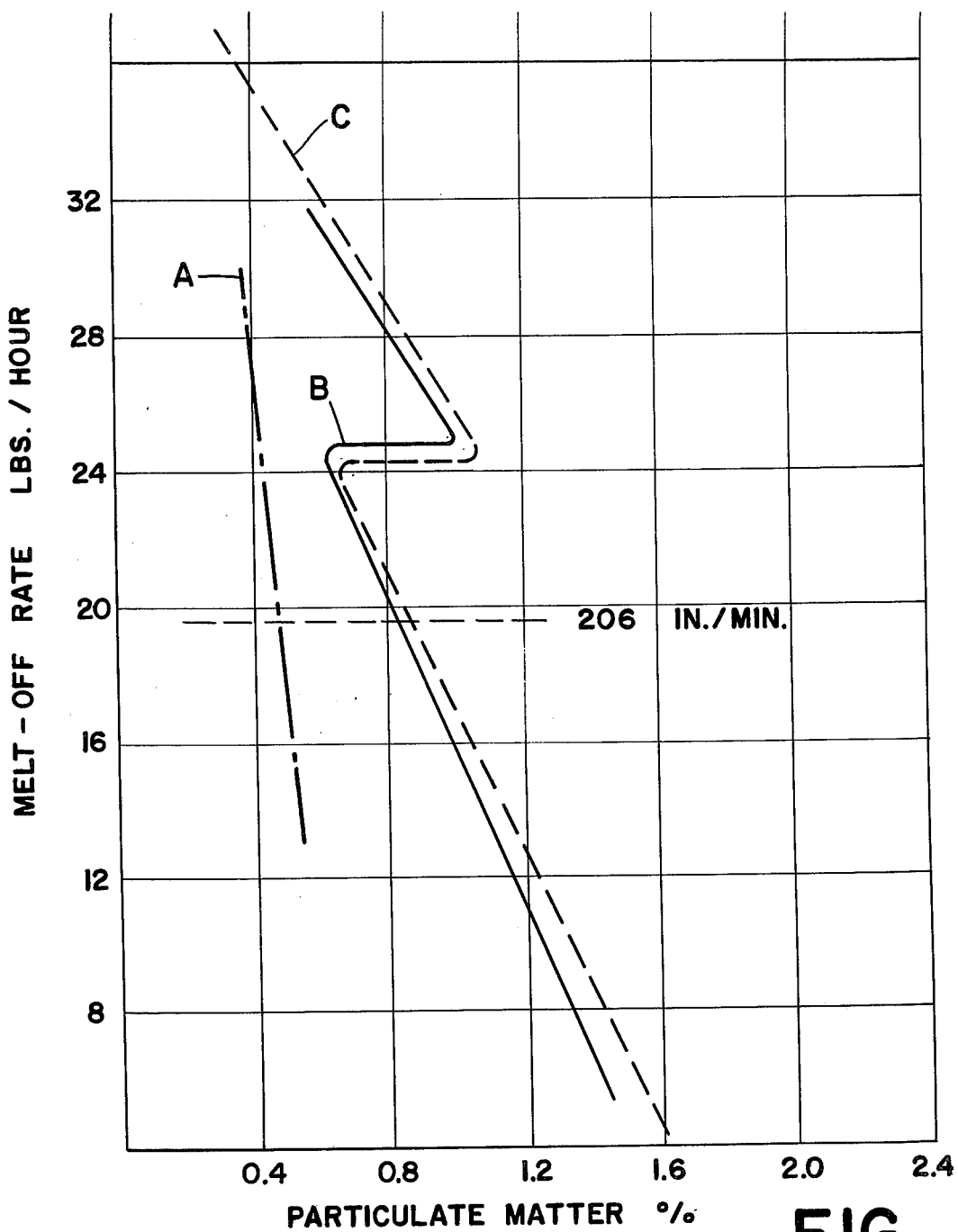
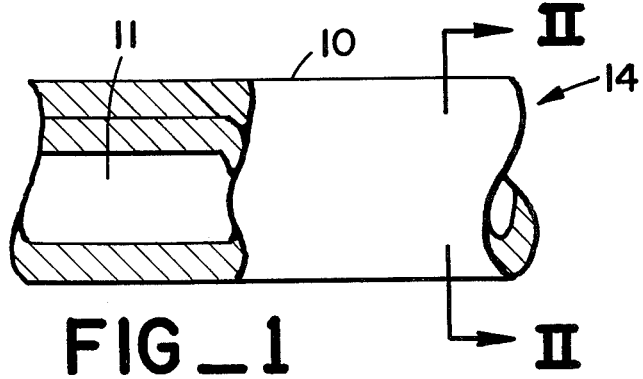
FIG_1
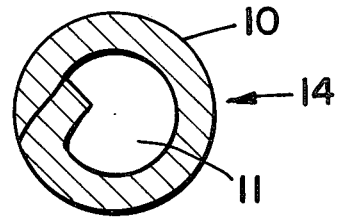
FIG_2

WELDING FLUX FORMULATION AND PROCESS FOR FUME REDUCTION

BACKGROUND OF THE INVENTION

1. Field of the Invention

The invention is concerned with welding and more particularly with welding fluxes which are used in an oxygen containing atmosphere. Most particularly, the invention is concerned with reducing the particulate matter or "smoke" produced during a welding operation by using an improved and unique welding flux composition. The improved welding flux composition of the present invention also insures that the transfer of certain desirable metals to the weld is increased whereby less of these metals can be used in prior art welding operations.

2. Prior Art

The prior art teaches a number of flux formulations for use in welding processes. For example, the article "Effects of Complex Ferroalloys on the Transfer of Alloying Elements Into Deposited Metal" by I. G. Noskov (Automatic Welding, Volume 23, No. 12, Dec. 1970) discloses the use of ferroalloys which contain carbon, silicon, manganese and chromium to aid in the transfer of silicon and chromium into a deposited metal weld. U.S. Pat. No. 3,883,713 discloses a flux core which contains calcium, magnesium and strontium flourides. U.S. Pat. No. 2,909,778 discloses the use of magnesium manganese and the like and rare earths which create a smoky vapor barrier during the welding process. U.S. Pat. No. 3,491,225 discloses the use of fluxes which contain ferromanganese, ferrisilicon, ferrotitanium, ferroaluminum, and an arc stabilizer such as the oxides and salts of alkali metals. U.S. Pat. No. 3,643,061 discloses a welding core comprising a slag former, a fluxing agent, an arc stabilizer and a deoxidizer metal including manganese and silicon along with other metal alloys and ferroalloys. U.S. Pat. No. 2,909,650 discloses the uses of fluxes which contain various killing agents set out therein. U.S. Pat. No. 3,531,620 discloses the use of various flux compositions which may serve as denitrodizing agents. U.S. Pat. No. 3,735,090 discloses the use of various cores which may contain flourites, ferromanganese, alumina, manganese ore and iron powder. U.S. Pat. No. 3,733,458 discloses the use of cores which may contain ferromanganese, feldspar, rutile concentrate, ferrosilicate, and ferrosilicon along with iron powder.

While the prior art compositions each have many advantages, it has been found that with each of them a very noticeable amount of particulate matter, generally referred to as "smoke" is developed during a welding operation in an oxygen containing atmosphere. In this regard, it should be pointed out that even if the welding is shielded as with carbon dioxide gas that oxygen is still present in the atmosphere due to the decomposition of the carbon dioxide gas to elemental oxygen and carbon monoxide. The present invention is concerned with a unique flux formulation and to the use thereof in a welding composition, and a welding process whereby the particulate matter or smoke produced is very significantly reduced while the transfer of desirable metals such as manganese and/or magnesium into the weld is significantly increased.

SUMMARY OF THE INVENTION

In one sense the invention comprises a welding flux composition, comprising a first alloy including iron, at least two metals reactive with oxygen under welding conditions and selected from the group consisting of aluminum, titanium, zirconium and boron and a weld improving metal selected from the group consisting of magnesium and manganese, said first alloy comprising from about 1 percent to about 4.5 percent by weight of said flux composition.

In another sense, the invention is concerned with a weld forming composition comprising a metal tube having therewithin a welding flux as set out above.

In yet another sense, the invention comprises a process for reducing particulate matter produced during a welding operation comprising a welding flux used in said operation including from about 1 percent to about 4.5 percent by weight of the first alloy set out above.

BRIEF DESCRIPTION OF THE DRAWINGS

The invention will be better understood by reference to the drawing in which like numbers denote like parts throughout and wherein:

FIG. 1 comprises an enlarged side-sectional view with portions broken away of an arc welding electrode embodying the present invention;

FIG. 2 illustrates a cross-sectional view of FIG. 1 taken along line II—II thereof; and FIG. 3 illustrates graphically the significant reduction in particulate matter obtained when using the welding flux of the present invention in the welding electrode of the present invention.

DETAILED DESCRIPTION OF THE PREFERRED EMBODIMENT

Surprisingly, it has been found that when a welding flux composition includes therein a very particular ferroalloy including at least two metals reactive with oxygen under welding conditions, said two metals being selected from aluminum, titanium, zirconium and boron and a weld improving metal selected from magnesium and manganese in an amount of 1 to 4.5 percent by weight of the flux composition, the amount of particulate matter or smoke produced during a welding operation utilizing such a welding flux composition is very significantly reduced. It should be noted that it is essential to the practice of the present invention that the ferroally contain at least two of the above oxygen reactive metals. The use of a single such metal will to some extent perhaps aid in transferring the magnesium and/or manganese into the eventually formed weld, but will not reduce smoke formation to anywhere near the extent that the combination of at least two of the metals in the ferroalloy will reduce it. It is preferred that the ferroalloy include aluminum and titanium of these four oxygen reactive metals. Preferably, the metal alloy will further include zirconium. The presence of boron is also desirable in the metal alloy although it is less important than are the other three components. Based on the total weight of the ferroalloy, the aluminum is preferably present in amounts of about 4 to about 25 weight percent, the titanium in an amount from about 5 to about 40 weight percent, the zirconium in an amount from about 1 to about 15 weight percent, and the boron in an amount from about 0.1 to about 5 weight percent with the remainder of the ferroalloy being iron. Preferably, the amount of the aluminum will fall within a range from about 10 to about 15 weight percent, the titanium in a range from about 15 to about 25 weight percent, the zirconium in an amount from about 2 to about 6 weight percent, and the boron in an amount from about 0.25 to about 1.5 weight percent.

Preferably, the ferroalloy may also contain magnesium or manganese, generally in an amount from about 1 to about 20 weight percent and more preferably in an amount from about 4 to about 12 weight percent. Silicon may also be present in the alloy in an amount from about 1 to about 10 weight percent and more generally in an amount from about 2 to about 8 weight percent. The above weight percent of the metals in the ferroalloy are based on the total weight of the ferroalloy itself. The ferroalloy, as previously stated, will generally form only a relatively minor amount of the total welding flux composition. That is, it will generally only form from about 1 to about 4.5 weight percent of the flux composition. The use of such a ferroalloy in combination with a flux composition will generally significantly reduce the amount of weld improving metals such as magnesium and manganese which must be included in the flux formulation to obtain adequate transfer thereof to the eventually formed weld. Thus, it has been found that the amount of total manganese in the flux formulation can be reduced generally by 20 percent or more when a ferroalloy as set out above is included in a welding flux composition in the amount set out above to obtain an equal amount of transfer of the manganese into the weld.

A preferred welding flux composition would generally include along with the ferroalloy set out above a second alloy which would include iron and manganese and/or magnesium and a third alloy including iron and silicon. Generally, the amount of the titanium dioxide together with the second alloy and the third alloy would comprise at least about 50 percent by weight of the flux composition.

Turning first to FIG. 3 of the drawings, there is shown therein graphically the amount of particulate matter, in percent based on the weight of the weld wire fed in against the melt-off rate in pounds per hour of the welding wire. Curve A represents a welding flux composition containing 2.65 weight percent of an alloy which comprises 13 percent aluminum, 20 percent titanium, 4 percent zirconium, 8 percent manganese, a maximum of 5 percent silicon, 1 percent boron, and the balance iron. Curves B and C each represent commercial flux core welding wires and in fact represent the two best, in the sense of lowest smoking, commercial welding wires located in a test of over 38 commercial welding wires tested. As will be noted by reference to FIG. 3, the percent of particulate matter with the welding flux composition of the present invention at a normal weld rate of 206 inches (523 centimeters) per minute of wire feed speed is only about 0.5 percent with the flux of the present invention, whereas it is about 0.85 percent with the best prior art flux containing welding wires. As will be further apparent from examination of FIG. 3 of the drawings, use of the welding flux composition of the present invention generally leads to a reduction in smoke over a wide range of melt-off rates of weld wire from about 4 pounds/hour [1.8 kilogram/hour] to about 36 pounds/hour [16.4 kilogram/hour]).

Turning to FIG. 1 of the drawings, there is illustrated therein an external metal shield 10 having therewithin a flux composition 11 which is particulate in nature, has its components intimately intermixed and dispersed throughout one another and is packed in place within an overall weld electrode 14. It is clear that the structure of this electrode, other than the composition of the particular welding flux, is essentially identical to the structure of welding electrodes of the prior art.

While the exact reason for the advantageous operation of the welding flux composition of the present invention may not be understood, and without meaning to be bound by theory, it is noted that the aluminum, titanium, zirconium and boron present in the ferroalloy are believed to act as preferential oxygen getters thereby picking up oxygen from carbon dioxide decomposition when carbon dioxide is used as the shielding gas, or from air if carbon dioxide is not used as shielding gas, so that manganese or magnesium present in the ferroalloy and in other parts of the flux composition cannot react with the oxygen which has been thereby removed from the vicinity of the weld and thus the manganese and/or magnesium can travel through to the weld thereby leading to a stronger weld having better grain size. The reaction of the aluminum, titanium, zirconium and boron with the oxygen gas does not lead to the production of particulate matter to the same extent as does the reaction of manganese or magnesium with the oxygen in this area. Thus, both the health hazard to the operator created by the smoke and the difficulty which the operator encounters in trying to observe a weld which he is making are eliminated through use of the welding flux composition of the present invention.

A particularly useful overall flux formulation comprises a rutile (a titanium dioxide-containing mineral) in an amount of generally from about 20 to about 40 weight percent, an iron-manganese or iron-magnesium alloy generally in the amount from about 10 to about 20 weight percent, an iron-silicon alloy, generally in an amount from about 4 to about 20 weight percent, an alkali metal silicate such as sodium silicate generally in an amount from about 3 to about 18 weight percent, an artificial glass such as sandspar, which is a commercially-available feldspar, i.e. sodium potassium aluminate, generally in an amount from about 1 to about 12 weight percent, zirconium oxide, generally in an amount from about ½ to about 10 weight percent, magnetite, generally in an amount from about ½ to about 10 weight percent, a ferrotitanium alloy, generally in an amount from about 0.5 to about 8 weight percent, an alkali metal carbonate, e.g. potassium carbonate generally in an amount of about 0.1 to about 2 weight percent. Generally, it is preferred that the silicate and the carbonate between them provide most of the alkali metals, sodium and potassium, in the flux formulation. The remainder of the flux formulation generally comprises the 1 to 4.5 weight percent of the ferroalloy which includes iron and at least two metals reactive with oxygen under welding conditions selected from the group consisting of aluminum, titanium, zirconium and boron and a weld improving metal selected from the group consisting of magnesium and manganese. A particularly preferred flux formulation contains 30 to 40 percent rutile, 15 to 25 percent iron-manganese alloy or iron-magnesium alloy, 8 to 13 percent of a ferrosilicon alloy, 6 to 11 percent sodium silicate, 3 to 7 percent sandspar, 2 to 6 percent zirconium oxide, 2 to 6 percent potassium carbonate or silicate, and 2 to 3 percent of the ferroalloy including iron and at least two metals selected from aluminum, titanium, zirconium and boron and a weld improving metal selected from magnesium and manganese.

The particular flux formulation which was tested to produce the amount of smoke shown for the improved flux composition of the present invention in FIG. 3 comprised 36 percent rutile, 20 percent iron-manganese alloy, 10.4 percent ferrosilicon alloy, 8.5 percent sodium silicate, 4.9 percent sandspar, 4.0 percent zirconium oxide, 3.8 percent magnetite, 2.7 percent ferrotitanium alloy, 0.5 percent potassium carbonate, and 2.65 percent of the ferroalloy containing at least the two oxygen reactive metals selected from aluminum, titanium, zirconium and boron and a weld improving metal selected from the group consisting of magnesium and manganese.

While the invention has been described in connection with specific embodiments thereof, it will be understood that it is capable of further modification, and this application is intended to cover any variations, uses or adaptations of the invention following, in general, the principles of the invention and including such departures from the present disclosures as come within known or customary practice in the art to which the invention pertains and as may be applied to the essential features hereinbefore set forth, and as fall within the scope of the invention and the limits of the appended claims.

What is claimed is:

1. A welding flux composition which produces a reduced amount of particulate matter, comprising:
   a first distinct alloy having at least four metals, said first alloy including iron, at least two metals reactive with oxygen under welding conditions selected from a group consisting of aluminum, titanium, zirconium and boron and a weld improving metal selected from a group consisting of magnesium and manganese, said first alloy comprising from about 1 percent to about 4.5 percent of said flux composition.

2. A composition as in claim 1, wherein said first alloy includes aluminum and titanium with the amount of said aluminum falling within a range from about 4 weight percent to about 25 weight percent and the amount of said titanium falling within a range from about 5 weight percent to about 40 weight percent, said weight percentages being based on the total weight of said first alloy.

3. A composition as in claim 2 including titanium dioxide, a second alloy including iron and manganese or magnesium and a third alloy including iron and silicon, said titanium dioxide together with said second alloy and said third alloy comprising at least about 50 percent of said flux composition.

4. A composition as in claim 3, wherein said first alloy includes zirconium in an amount which falls within a range from about 1 weight percent to about 15 weight percent based on the total weight of said first alloy.

5. A composition as in claim 4, wherein said first alloy includes boron in an amount which falls within a range from about 0.1 weight percent to about 5 weight percent based on the total weight of said first alloy.

6. A process for reducing particulate matter produced during a welding operation, comprising including in a welding flux used in said operation from about 1 percent to about 4.5 weight percent based on the total weight of said flux of a first distinct alloy having at least four metals, said first alloy including iron, at least two metals reactive with oxygen under welding conditions selected from the group consisting of aluminum, titanium, zirconium and boron and a weld improving metal selected from the group consisting of magnesium and manganese.

7. A process as in claim 6 wherein said flux includes titanium dioxide, a second alloy including iron and manganese or magnesium and a third alloy including iron and silicon, said titanium dioxide together with said second alloy and said third alloy comprising at least about 50 weight percent of said flux composition.

8. A process as in claim 7 wherein said flux includes aluminum and titanium in amounts which fall within the range from about 4 weight percent to about 25 weight percent aluminum and from about 5 weight percent to about 40 weight percent titanium, said weight percentages of aluminum and titanium being based on the total weight of said first alloy.

9. A process as in claim 8 wherein said first alloy includes zirconium in an amount from about 1 weight percent to about 15 weight percent based on the total weight of said first alloy.

10. A process as in claim 9 wherein said first alloy includes boron in an amount from about 0.1 weight percent to about 5 weight percent based on the total of said first alloy.

11. A weld forming electrode comprising a metal tube having therewithin a compacted welding flux comprising:
   a first distinct alloy having at least four metals, said first alloy including:
   iron;
   at least two metals reactive with oxygen under welding conditions selected from the group consisting aluminum, titanium, zirconium and boron; and
   a weld improving metal selected from the group consisting of magnesium and manganese, said first alloy comprising from about 1 percent to about 5 percent by weight of said flux composition.

12. A weld forming composition as in claim 11 including titanium dioxide, a second alloy including iron and manganese or magnesium and a third alloy including iron and silicon, said titanium dioxide together with said second alloy and said third alloy comprising at least about 50 percent of said flux.

13. A welding electrode as in claim 12 wherein said first alloy includes aluminium in an amount from about 4 weight percent to about 25 weight percent and titanium in an amount from about 5 weight percent to about 40 weight percent based on the total weight of said first alloy.

14. An electrode as in claim 13 wherein said first alloy includes zirconium in an amount from about 1 weight percent to about 15 weight percent based on the total weight of said first alloy.

15. An electrode as in claim 14 wherein said first alloy includes boron in an amount from about 0.1 weight percent to about 5 weight percent based on the total weight of said first alloy.

* * * * *

UNITED STATES PATENT OFFICE
CERTIFICATE OF CORRECTION

Patent No. 4,122,238      Dated October 24, 1978

Inventor(s) JOHN G. FRANTZREB, SR.

It is certified that error appears in the above-identified patent and that said Letters Patent are hereby corrected as shown below:

Title Page, Section [75] Inventor, name should read:
    --JOHN G. FRANTZREB, SR.--

Signed and Sealed this

Second Day of October 1979

[SEAL]

Attest:

RUTH C. MASON
Attesting Officer

LUTRELLE F. PARKER
Acting Commissioner of Patents and Trademarks